A. L. CHAMBERS & N. BANE.
WALKING BEAM.
APPLICATION FILED JULY 31, 1909.
1,013,533.
Patented Jan. 2, 1912.
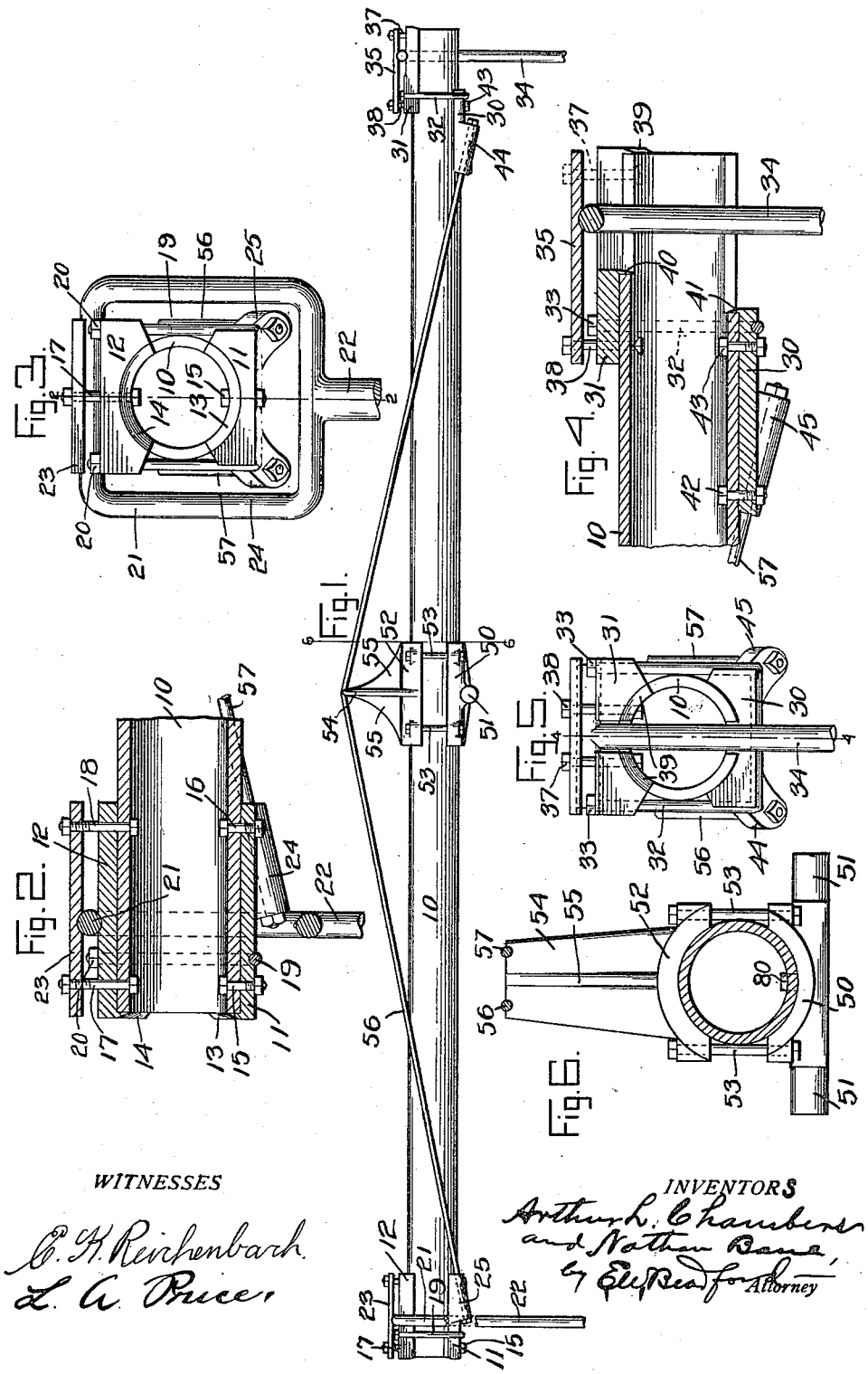
WITNESSES
C. H. Reichenbach.
L. A. Price.
INVENTORS
Arthur L. Chambers
and Nathan Bane,
by Eli Rea for Attorney

UNITED STATES PATENT OFFICE.

ARTHUR L. CHAMBERS AND NATHAN BANE, OF SMITHFIELD, WEST VIRGINIA.

WALKING-BEAM.

1,013,533.   Specification of Letters Patent.   Patented Jan. 2, 1912.

Application filed July 31, 1909. Serial No. 510,673.

*To all whom it may concern:*

Be it known that we, ARTHUR L. CHAMBERS and NATHAN BANE, citizens of the United States, residing at Smithfield, in the county of Wetzel and State of West Virginia, have invented certain new and useful Improvements in Walking-Beams, of which the following is a specification.

Our said invention consists in an improved construction of trussed walking-beam, designed especially for use in pumping and driving wells, such as oil and gas gas wells, etc., whereby a tube or casing of the character used in casing up such wells may be utilized as the main part of said walking-beam, all as will be more fully described and claimed.

Referring to the accompanying drawings which are made a part hereof and on which similar reference numerals indicate similar parts, Figure 1 is a side elevation of a walking-beam constructed in accordance with our said invention, Fig. 2 a longitudinal section through one end thereof on the dotted line 2—2 in Fig. 3, Fig. 3 an end elevation of Fig. 2, Fig. 4 a longitudinal section through the opposite end of said walking-beam, Fig. 5 an end elevation thereof, and Fig. 6 a cross section on the dotted line 6—6 in Fig. 1.

Said walking-beam consists of a section of tube, or well-casing, 10, of the diameter and length desired for the purpose. On one end it is provided with a fitting 11 on the under side and a fitting 12 on the top side, both of cast metal and each formed to fit the surface of the tube and with a flange 13 and 14, respectively, to fit over the end of the tube and hold said fitting from sliding toward the center thereof. Bolts 15 and 16 extend through the fitting 11 and the tube and bolts 17 and 18 extend through the upper fitting 14 and the tube to secure them in place. A U-shaped clamping bolt 19 fits into notches in the sides of said fittings and is provided with nuts 20 on the upper end of each of its branches by which the two fittings are clamped together and held securely to the end of the tube, or casing, 10. A shallow transverse recess is formed in the upper surface of the fitting 12 in which the upper bar of yoke 21 on the upper end of a connecting rod 22 is adapted to rest and work. A plate 23, with a shallow recess in its under side, is mounted on the top of said yoke with its recess engaging the upper surface thereof, being secured on the upper end of the bolts 17 and 18. Said plate thus serves to hold the yoke in position while permitting its free rocking movement in its bearing on said fitting 12 as the walking-beam moves up and down. The bolts 17 and 18 are located centrally in relation to the vertical axis of the tube and the plate 23 so that said plate may be permitted to rock slightly without undue strain upon the parts. Side wings 24 and 25 are formed on the lower corners of the fitting 11 extending somewhat at an angle and with longitudinal perforations for the attachment of the truss rods, as will be presently described.

The opposite end of the tube, or casing, 10 is provided with fittings 30 and 31 on its under and top sides respectively of somewhat the same form and secured in somewhat the same manner as just described for the fittings on the opposite end. The fitting 30 is secured to the fitting 31 by the U-shaped clamping bolt 32, which engages with notches in the sides of said fitting, respectively, and has nuts 33 on the upper end of each of its branches. The tube, or casing, 10, at its end, however, is formed with a central vertical slot extending back some distance from its extreme end and extending back to a greater distance in its lower side to accommodate the swing of a connecting rod 34 which is formed with a T-shaped upper end and extends through said slot with its cross-bar engaging in a shallow recess in the top of fitting 31 and in the under side of a plate 35 secured on bolts 36, 37 and 38, the forward bolts 37 and 38 being located on each side of the slot. See Fig. 5. The fitting 31 is also formed with a slot corresponding to the slot in the upper side of the tube 10 and has a flange 39 on its outer end and a flange 40 at the end of the slot to fit against the end of the pipe, or casing. The outer end of the fitting 30 on the under side of the pipe extends only to the inner end of the slot in the under side of the pipe, being formed with a flange 41 which hooks over the end of the pipe between the sides of the slot. The outer end of fitting 30 extends beyond the inner end of fitting 31 and the U-shaped clamping bolt 32 engages with the outer end of one fitting and the inner end of the other. Said fitting 30 is bolted to the pipe or tube by bolts 42 and 43 located centrally in relation to the bottom of the pipe. Diagonally extending side wings 44 and 45 are formed on the lower corners of said fitting 30 with diagonally extending longitudinal perforations to receive the ends of the truss rods. A casting 50 is mounted on the under side of the tube or casing in the center thereof being secured by a central lug 80 thereon engaging in a central hole in the under side of the tube. Said casting is formed with transversely extending gudgeons 51 adapted to be mounted in the box, or bearings, provided therefor on the upper end of the derrick, or other framework on which the walking-beam is to be mounted. A casting 52 is mounted on the top side of said casing at its center secured to the casting 50 by means of bolts 53 extending through perforations in side wings on said respective castings and is formed with an upwardly extending truss support 54, suitably braced by flanges 55. Truss rods 56 and 57 rest in notches in the upper end of said support 54 and at their ends extend through the perforations in the wings 24 and 25 of the fitting 11 on one end of the casing 10 and through the perforations in the wings 44 and 45 of the fitting 30 on the other end of said casing, being formed screw-threaded and provided with nuts on their outer ends by which they may be drawn to the desired tension and the casing thus trussed and given the necessary strength and support for the work for which it is designed.

In use the walking-beam is mounted with the trunnions 51 in the bearings provided therefor on the top of the derrick, or other framework, provided for the purpose. The engine, or other power, is connected with the connecting rod 22 at one end and the pump, or drilling, or boring mechanism, is connected with the connecting rod 34 at the other end. The operation proceeds as is common with any form of walking-beam. The connecting-rod 22 is permitted to rock in its bearings on the fitting 12 while being held in place by the plate 23. The connecting rod 34 at the other end is held in place by the plate 35 with its transverse bar resting in the bearing provided therefor in the top fitting 31 and is adapted to swing as the walking-beam tilts on its gudgeons, with the connecting rod swinging back and forth in the longitudinal slot provided in the end of the casing.

By this arrangement a very efficient and satisfactory walking-beam for the purpose is provided of sufficient strength and rigidity and at comparatively small expense, it being possible to utilize the tubing, or casing, provided for the purpose of driving the wells, which is always available where such work is being done.

Having thus fully described our said invention, what we claim as new, and desire to secure by Letters Patent is:

1. A walking-beam comprising a metal tube with metal fittings on each end adapted to receive and furnish bearings for the connecting rods which fittings are secured in position on said tube by means of flanges formed on said fittings and engaging the ends of said tube and bolts passing through said tube and said fittings, said bolts, a central block, or casting, formed with gudgeons and mounted midway on the under side of said tube, a second casting, or block, on the top of said tube above said central block to which it is connected, said top block being formed with an elevated truss-support, and truss-rods passing over said support and connected with the fittings on the under side and at each end of said tube, substantially as set forth.

2. A walking-beam comprising a tubular casing of appropriate length and diameter, a casting mounted centrally on its under side carrying gudgeons on which the walking-beam may be mounted, a block mounted on top of said tubular casing above said block carrying the gudgeons and connected therewith and having an elevated truss-support formed thereon, fittings mounted on the under side of said tubular casing at each end and connected therewith by engaging flanges and having diagonally projecting side wings with longitudinal perforations, truss-rods mounted on said truss-support in the center of said tubular casing and with their ends extending through said perforations and said end fittings and provided with tightening means, saddle blocks on the top of each end of said casing connected with the fittings on the under side and containing bearing recesses to receive the ends of the connecting-rods for connecting the walking-beam with the power and the work, substantially as set forth.

3. A walking-beam comprising a tubular casing, a center block having gudgeons on which said walking-beam may be mounted, a truss-support connected therewith at a central point, fittings at the ends adapted to receive and support the ends of the rods connecting the walking-beam with the work and the power, one end of said walking-beam being formed with a vertical slot extending longitudinally thereinto for a distance, and a connecting-rod with its upper end formed T-shaped and mounted in said slot with its cross-bar in a recess in the tube fitting, substantially as set forth.

4. A walking-beam comprising a tubular casing, fittings at each end and in the center, the central fittings carrying the gudgeons on which the walking-beam is mounted to rock and an upwardly projecting truss-support, the end fittings on the lower side being formed to engage with the outer ends of the truss-rods, said truss-rods extending over said truss-supports and engaging with said lower end fittings, the upper end fittings formed to receive the ends of the connecting-rods, a plate mounted thereon and formed recessed to engage and hold said connecting-rods in place and bolts passing through said plate, said upper fittings and the top side of the tubular casing on a central line and radially to said tube, whereby said connecting-rods are securely but loosely held to their seats, substantially as set forth.

In witness whereof, we have hereunto set our hands and seals at Smithfield, West Virginia, this 27th day of July, A. D. nineteen hundred and nine.

ARTHUR L. CHAMBERS. [L. S.]
NATHAN BANE. [L. S.]

Witnesses:
JACOB ZUNNIER,
W. H. DILLAMAN.

Copies of this patent may be obtained for five cents each, by addressing the "Commissioner of Patents, Washington, D. C."